United States Patent
Ko

(10) Patent No.: US 7,457,539 B2
(45) Date of Patent: Nov. 25, 2008

(54) 2×2 OPTICAL SWITCH

(75) Inventor: Jimmy Ko, San Leandro, CA (US)

(73) Assignee: LIGHTech Fiberoptics, Inc., San Leandro, CA (US)

(*) Notice: Subject to any disclaimer, the term of this patent is extended or adjusted under 35 U.S.C. 154(b) by 571 days.

(21) Appl. No.: 10/842,587

(22) Filed: May 10, 2004

(65) Prior Publication Data

US 2005/0249454 A1    Nov. 10, 2005

(51) Int. Cl.
*H04J 14/00* (2006.01)
*G02B 6/26* (2006.01)

(52) U.S. Cl. .............................. 398/45; 398/48; 385/15; 385/16; 385/18; 385/47

(58) Field of Classification Search ............. 398/12–34, 398/45–50, 82–83; 385/16–57; 359/280; 324/415
See application file for complete search history.

(56) References Cited

U.S. PATENT DOCUMENTS

| 5,000,534 | A | | 3/1991 | Watanabe et al. | 350/96.2 |
|---|---|---|---|---|---|
| 6,002,818 | A | | 12/1999 | Fatehi et al. | 385/17 |
| 6,005,998 | A | | 12/1999 | Lee | 385/33 |
| 6,094,293 | A | * | 7/2000 | Yokoyama et al. | 359/280 |
| 6,259,835 | B1 | | 7/2001 | Jing | 385/18 |
| 6,285,022 | B1 | | 9/2001 | Bhalla | 250/227.22 |
| 6,385,364 | B1 | | 5/2002 | Abushagur | 385/16 |
| 6,396,976 | B1 | | 5/2002 | Little et al. | 385/18 |
| 6,415,067 | B1 | | 7/2002 | Copner et al. | 385/16 |
| 6,470,111 | B2 | * | 10/2002 | Mortenson et al. | 385/18 |
| 6,796,718 | B2 | * | 9/2004 | Jones et al. | 385/57 |
| 2004/0251906 | A1 | * | 12/2004 | Staple et al. | 324/415 |
| 2006/0039645 | A1 | * | 2/2006 | Uesugi | 385/18 |

OTHER PUBLICATIONS

Fan et al: "MEMES Optical Switches", IEEE LEOS 2001, pp. 10-11, 2001.*
Robinson: "MEMS Technology—Micromachines Enabling the "All Optical Network"", IEEE Electronic Components and Technology Conference, 2001.*
Fan et al: "MEMES Optical Switches", IEEE LEOS 2001, pp. 10-11, 2001.*
"Fast Fiber Optic 2×2 Switch", Sercalo Microtechnology Ltd., Principality of Liechtenstein, 2002.
"Multimode Fiber Optic Switch", Northrop Grumman Component Technologies, 2002.

* cited by examiner

*Primary Examiner*—Kenneth N Vanderpuye
*Assistant Examiner*—Li Liu
(74) *Attorney, Agent, or Firm*—Saile Ackerman LLC; Stephen B. Ackerman; Billy Knowles

(57) ABSTRACT

A 2×2 optical switch routs each light signal received from input ports to selected output. The optical switch has an adjustable light signal steering element, a fixed light signal steering element, and a steering element actuator. The adjustable light signal steering element is repositioned by the steering element actuator to selectively place one light signal received from the input ports such that the light signal is transferred from the input port to a selected output port. The fixed light signal steering element is placed in the path of each light signal such the light signals from the input ports is transferred to of mirrors, prisms, and light waveguides, default output ports, when the adjustable light steering element is removed from the path of each light signal.

39 Claims, 5 Drawing Sheets

2×2 OPTICAL SWITCH

BACKGROUND OF THE INVENTION

1. Field of the Invention

This invention relates generally to optical transmission systems. More particularly this invention relates to devices that switch light signals from input ports to selected output ports connected to fiber optic transmission cables.

2. Description of Related Art

Optical switches, particularly 2×2 optical switches, are known in the art. Examples of such switches are the SW2×2-9N12-16 manufactured by Sercalo Microtechnology, Ltd., Principality of Liechtenstein and the F04635 manufactured by Poly-Scientific Fiber Optic Products of Northrop Grumman Corporation, Blacksburg Va. Each of these optical switches employ optical micro electromechanical systems to adjust mirrors to steer light signals from input ports to output ports. Generally, the input ports and the output ports are placed on opposing sides of the packaging of the optical switch.

In many of the existing optical switches, six or more mirrors are used to steer the light signals from the input ports to the output ports. The additional mirrors add to the complexity of the optical path and increase the insertion loss and light dispersion of the switch. Further, having the connections for the input and output ports on opposing sides of the switch complicates the packaging and system structure of an optical network.

U.S. Pat. No. 6,002,818 (Fatehi, et al.) describes a free-space optical signal switch. The optical signal switch employs a rotating prism for transmitter beam steering for controlling to which receiver an optical signal from a transmitter is directed.

U.S. Pat. No. 6,415,067 (Copner, et al.) reveals a four port optical switch. The switch consists of two GRIN lenses. Each of the two GRIN lenses has two of the optical ports placed to receive light placed at their outer end face. A movable optical element in the form of a light transmissive wedge having a reflective surface is selectively moved into the path between the two GRIN lenses to direct a light signal from the first GRIN lenses to the second GRIN lens. The wedges have a reflective surface to direct light signals from one port of the two GRIN lenses to the adjacent port of the adjacent port on the same GRIN lens. A second wedge is employed to direct the light signal between different ports of the two GRIN lenses.

U.S. Pat. No. 6,005,998 (Lee) teaches a scalable, non-blocking fiber optic matrix switch. The matrix switch has two arrays of light beam collimators arranged to face one another in free space, and a number of optical fibers coupled to each of the arrays. Each collimator has a tubular body with a fiber receiving part at one end, and a lens mounting part at an opposite end of the body. A lens fixed in the mounting part produces a collimated light beam from light emitted from an end of an optical fiber inserted in the fiber receiving part. First and second motor assemblies with corresponding positioning elements displace the collimator body so that its light beam is steered to a desired position along "X" and "Y" axes in response to operation of the motor assemblies. A signal carried on a fiber entering a first collimator in one array can be switched into a fiber of a second collimator in the opposite array, by displacing the collimators so as to direct the beam of the first collimator to align with a lens axis of the second.

U.S. Pat. No. 6,259,835 (Jing) illustrates a mechanically actuated optical switch including stationary and movable optical reflectors. The movable reflectors are transferred between their on and off positions to switch an input optical signal to any one of multiple output optical fibers selected for transmitting the optical signal. The moveable reflectors are connected to an arm that is attached to a relay that causes the arm to selectively move. When the arm moves, the reflectors are placed in the path of the optical signal to transfer the signal to the output optical fibers.

U.S. Pat. No. 6,285,022 (Bhalla) demonstrates a front accessible optical beam switch. The optical beam switch is designed for improved serviceability by mounting two fiber optic beam deflection arrays to face the front of a rack assembly. Inside the optical beam switch, a mirror is located behind each of the two fiber optic beam deflection arrays and used to reflect the light beams between the two fiber optic beam deflection arrays. A controller adjusts the angle of the mirror such that the two fiber optic beam deflection arrays.

U.S. Pat. No. 6,385,364 (Abushagur) reveals an optical switch that guides data transmitting light beams along free space switching paths from one or more input optical fibers to one or more output optical fibers. The optical switch includes a microchip base member, diffractive, refractive or reflective optical elements positioned on carrier panels, and actuators for moving the carrier panels. The optical elements are able to be position by the actuators to guide light beams emitted by the input optical fibers in free space to the receiving output optical fibers. The actuators may be linear and/or rotary. Switching of light beams can be from one input port to one or many output ports, and vice versa, to form a free space optical cross-connect switch and router.

U.S. Pat. No. 6,396,976 (Little, et al.) describes a two dimensional optical switch. An array of micromachined mirrors are arranged on a first substrate at the intersections of input and output optical paths and oriented at approximately forty-five degrees to the paths. An array of split-electrodes is arranged on a second substrate above the respective mirrors. Each split electrode includes a first electrode configured to apply an electrostatic force that rotates the mirror approximately ninety degrees into one of the input optical paths to deflect the optical signal along one of the output optical paths, and a second electrode configured to apply an electrostatic force that maintains the mirror position.

U.S. Pat. No. 5,000,534 (Watanabe, et al.) shows an optical switch that includes at least one optical fiber exit terminal disposed in a plane, multiple optical fiber entrance terminals disposed in the plane, and a movable reflector disposed in the plane and angularly movable about a point in the plane for reflecting and/or refracting a light ray from the optical fiber exit terminal selectively into one of the optical fiber entrance terminals for thereby optically coupling the optical fiber exit terminal and to one of optical fiber entrance terminals.

SUMMARY OF THE INVENTION

An object of this invention is to provide an optical switch for routing each light signal received from a plurality of input ports to selected output ports of a plurality of output ports.

The accomplish at least this and other objects the optical switch has a plurality adjustable light signal steering elements, at least one fixed light signal steering element, and a steering element actuator. Each adjustable light signal steering element, when selectively placed in a path of one light signal received from one of the plurality of input ports, transfers the one light signal from the input port to a selected output port.

Each adjustable light signal steering element has a light bending element which receives the light signal from at least one input port and directs the light signal to at least one selected output port. The light bending element is mounted on a light bending element carrier. The light bending element carrier is connected to the steering element actuator to selectively place the light bending element in the path of the light signals. The light bending element is constructed from reflective elements such as mirrors, refractive elements such as prisms or light waveguides, or diffractive elements such as lenses.

The light bending element carrier causes the light bending element to move perpendicularly from an axis of the path of the light signal to selectively place the light bending element in the path of the light signal to steer the light signal to the selected output port. The light bending element carrier includes an arm connected such that the steering element actuator causes the arm to rotate and a bar connected to the arm. The light bending element is attached to the bar, such that the light bending element is moved perpendicularly to the axis of the light path when the arm is rotated.

The fixed light signal steering element is placed in the path of each light signal such the light signals from the plurality of input ports is transferred to a group of default output ports of the plurality of output ports. The fixed light steering elements are constructed from reflective elements such as mirrors, refractive elements such as prisms or light waveguides, or diffractive elements such as lenses. The fixed light steering elements are a plurality of mirrors placed to guide the light signal from the input port to the default output port. In the preferred embodiment the input ports and the output ports are situated adjacently with no more than three mirrors accomplishing the steerage of the light signal for each fixed light steering element.

The steering element actuator is in communication with the plurality of adjustable light signal steering elements to reposition the light signal steering elements such that a selected light signal steering element is placed in a path of one light signal received from one of the plurality of input ports to the selected output port. In the preferred embodiment, the steering element actuator is a relay that causes the selective placement of one light steering element in the path of at least one light signal.

DETAILED DESCRIPTION OF THE INVENTION

An optical 2×2 switch often has a normal mode, where a first input port receives a first light signal from a first fiber optic cable and conveys the first light signal to a second output port. A second input port receives a second light signal from a second fiber optic cable and conveys the second light signal to a first output port. This structure is particularly useful for a communication network having two systems connected with two fiber optic cables for essentially full duplex communications. The 2×2 switch is used to provide a mechanism to allow each system to diagnose problems within the communications network. The switch is set from the normal mode to a loop back mode where the first input port is connected to the first output port and the second input port is connected to the second output port. This allows each system connected to the communication network to transmit diagnostic signals and to receive the signals for determining the functioning of the components of the network, with the single point of failure being only the 2×2 switch.

Figure 1:
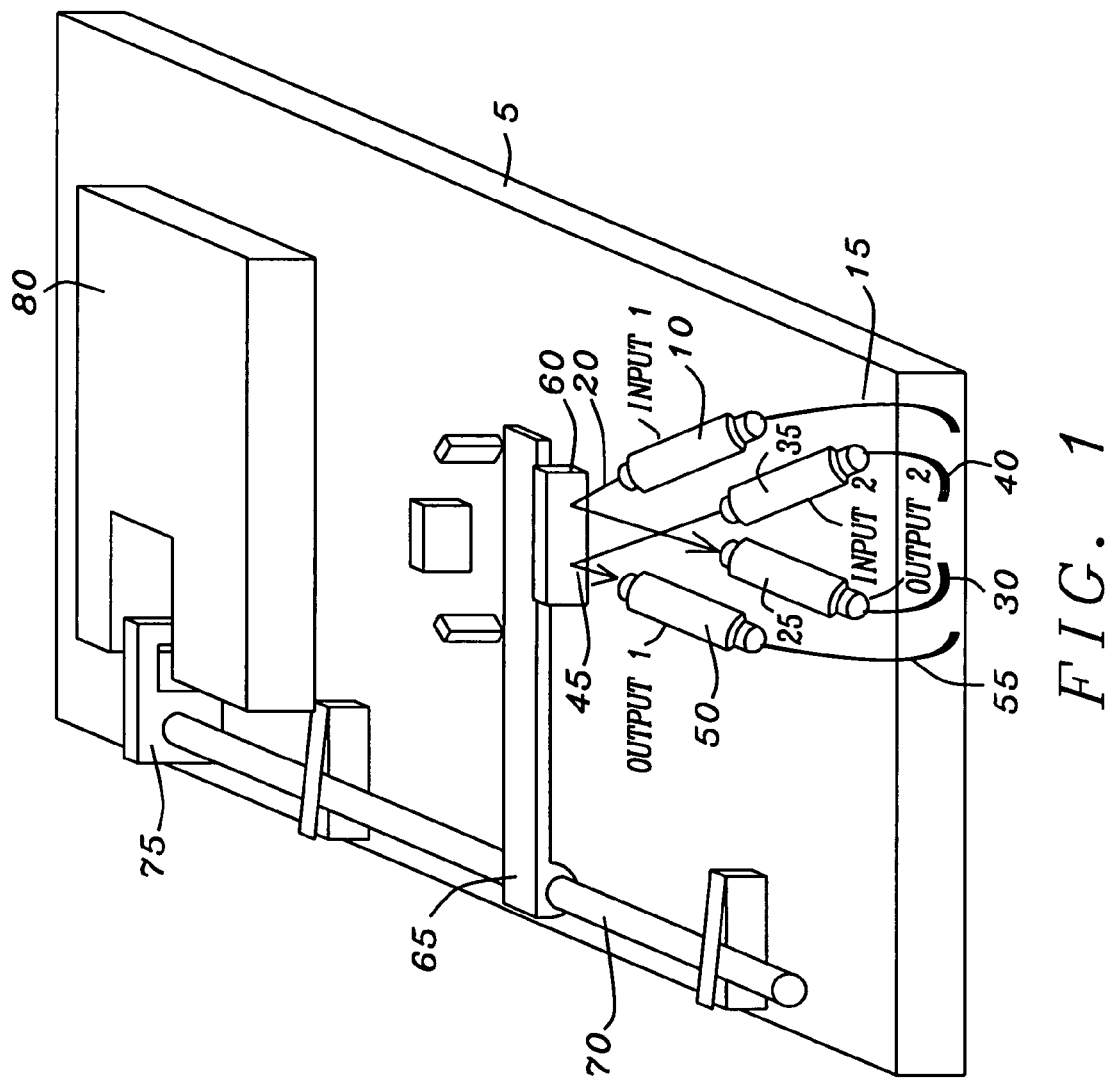
FIGS. 1 and 2 diagrammatically illustrate the structure of the optical switch of this invention.

Refer now to FIG. 1 for an explanation of the basic structure and function of the 2×2 switch of this invention. The input port 10 is aligned appropriately and bonded to the switch housing 5. A fiber optic cable 15 from a first of two systems transmitting the first light signal 20 is connected to the input port 10. The input port 10 is a collimator that receives the light signal and collimates the signal to remove any dispersion from passage of the light signal 20 through the fiber optic cable 15. In the preferred embodiment, the collimator 10 is either soldered or attached to the housing 5 with an adhesive such as an epoxy.

The light signal 20 is transferred from the input port 10 to a light bending or steering device 60. The light bending or steering device 60 is reflective elements such as mirrors, refractive elements such as prisms or light waveguides, or diffractive elements such as lenses. In the preferred embodiment, the light bending or steering device 60 is a mirror. The mirror 60 reflects the light signal 20 to the second output port 25. The second output port 25 is a collimator similar to that of the first input port 10 and is similarly aligned and attached to the switch housing 5. The alignment of the second output port 25 is such that the light signal 20 as reflected from the mirror 60 impinges upon the second output port 25. The second output port is connected to the fiber optic cable 30. The fiber optic cable 30 is connected to the second system for reception of the light signal 20. The collimator of the second output port 25 collimates the light signal 20 for removal of any dispersion resulting in the free space transmission and reflection from the mirror 60.

The second input port 35 is a collimator similar to the first input port 10. The second input port is connected to the fiber optic cable 49. The fiber optic cable is connected to the second system, which transmits the second light signal 45. As described for the first input port 10, the second input port 35 is a collimator that collimates the light signal 45 to remove dispersion resulting as a result of the passage of the light signal 45 through the fiber optic cable 40. The collimator of the input port 35 is aligned appropriately and bonded to the switch housing 5. In the preferred embodiment, the collimator 35 is either soldered or attached to the housing 5 with an adhesive such as an epoxy.

The light signal 45 is transferred from the input port 35 to the mirror 60. The mirror 60 reflects the light signal 45 to the first output port 50. The first output port 50 is a collimator similar to that of the first input port 10 and is similarly aligned and attached to the switch housing 5. The alignment of the first output port 50 is such that the light signal 20 as reflected from the mirror 60 impinges upon the first output port 50. The first output port 50 is connected to the fiber optic cable 55. The fiber optic cable 55 is connected to the first system for reception of the light signal 45. The collimator of the first output port 50 collimates the light signal 45 for removal of any dispersion resulting in the free space transmission and reflection from the mirror 60.

The mirror 60 is attached to the moveable bar 65. The moveable bar 65 is mounted to the rod 70 and the rod 70 has the connector 75. The connector 75 is in contact with the moving plunger of the relay 80. When the relay is not activated, the plunger has the connector 75 at a resting position such the rod 75 is at an initial position, with the moveable bar 65 set to have the mirror 60 as shown.

Figure 2:
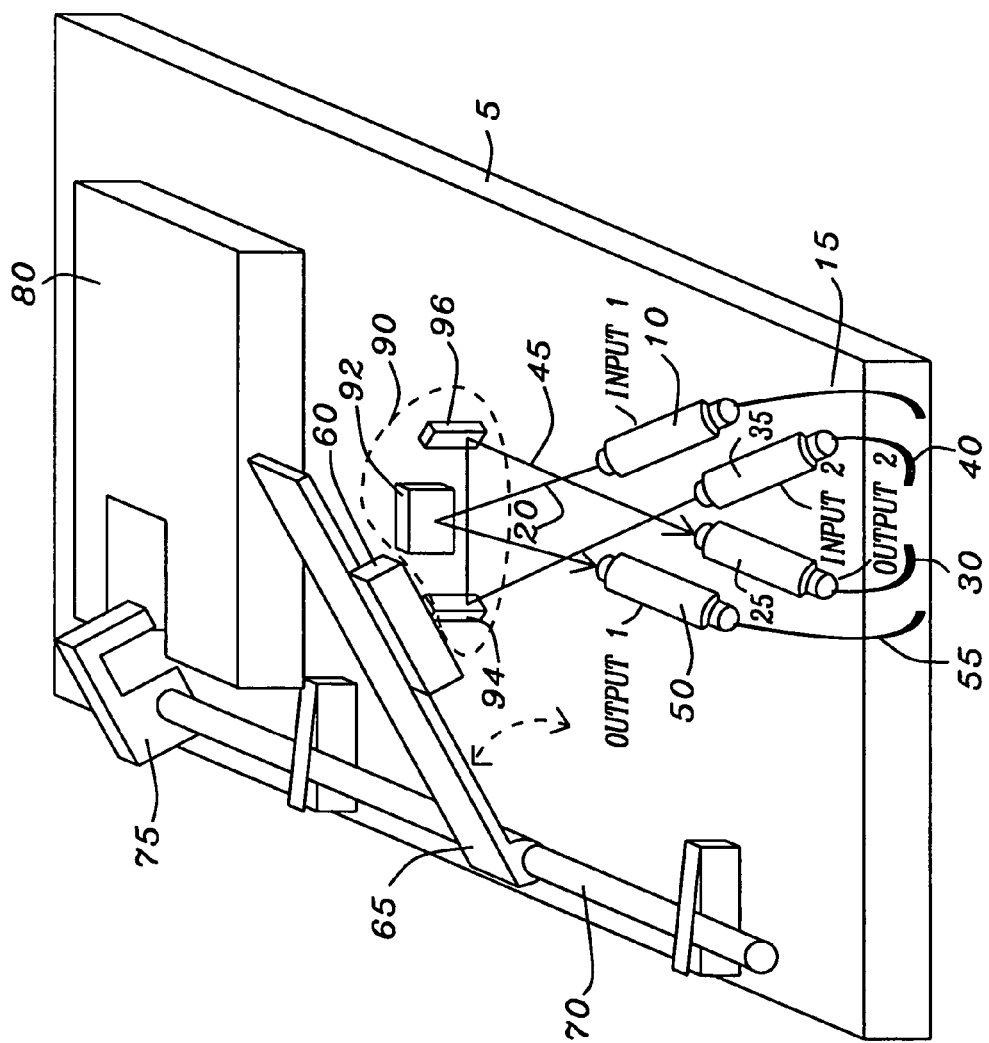

Upon activation of the relay 80 to change from the normal mode of operation of FIG. 1 to the loop back mode of operation as shown in FIG. 2, the plunger moves and the connector 75 causes the rod 70 to rotate. The rotation of the rod 70 causes the moveable bar 65 to move the mirror 60 in a motion perpendicular to the axis of the paths of the light signals 20 and 45 so that it is removed from the paths of the light signals 20 and 45 as shown in FIG. 2.

Once the mirror 60 is removed from the paths of the light signals 20 and 45, the light signals 20 and 45 now impinge upon the fixed light bending or steering device 90. The fixed light bending or steering device 90 is reflective elements such as mirrors, refractive elements such as prisms or light waveguides, or diffractive elements such as lenses. In the preferred embodiment, is formed of the mirrors 92, 94, and 96. The mirrors 92, 94, and 96 are placed and adhered to the switch housing 5 with an epoxy or a solder. The mirror 92 is aligned such the light signal 20 is transferred from the first input port 10 to the first output port 50. The mirrors 94 and 96 are aligned such that the light signal 45 is transferred from the second input port 35 to the second output port 25. This is the loop back mode of operation where the light signal 20, as transmitted by the first system is received by the first system and the light signal 45 as transmitted by the second system is received by the second system. This allows for each system to diagnose problems of the communications network coupling the two systems. The structure of the switch as shown in FIGS. 1 and 2 as is apparent is not restricted to having a normal mode and loop back mode, but may allow connection of the first and second system for communication to at least one other system with the first or second output being to the other system.

Figure 3:
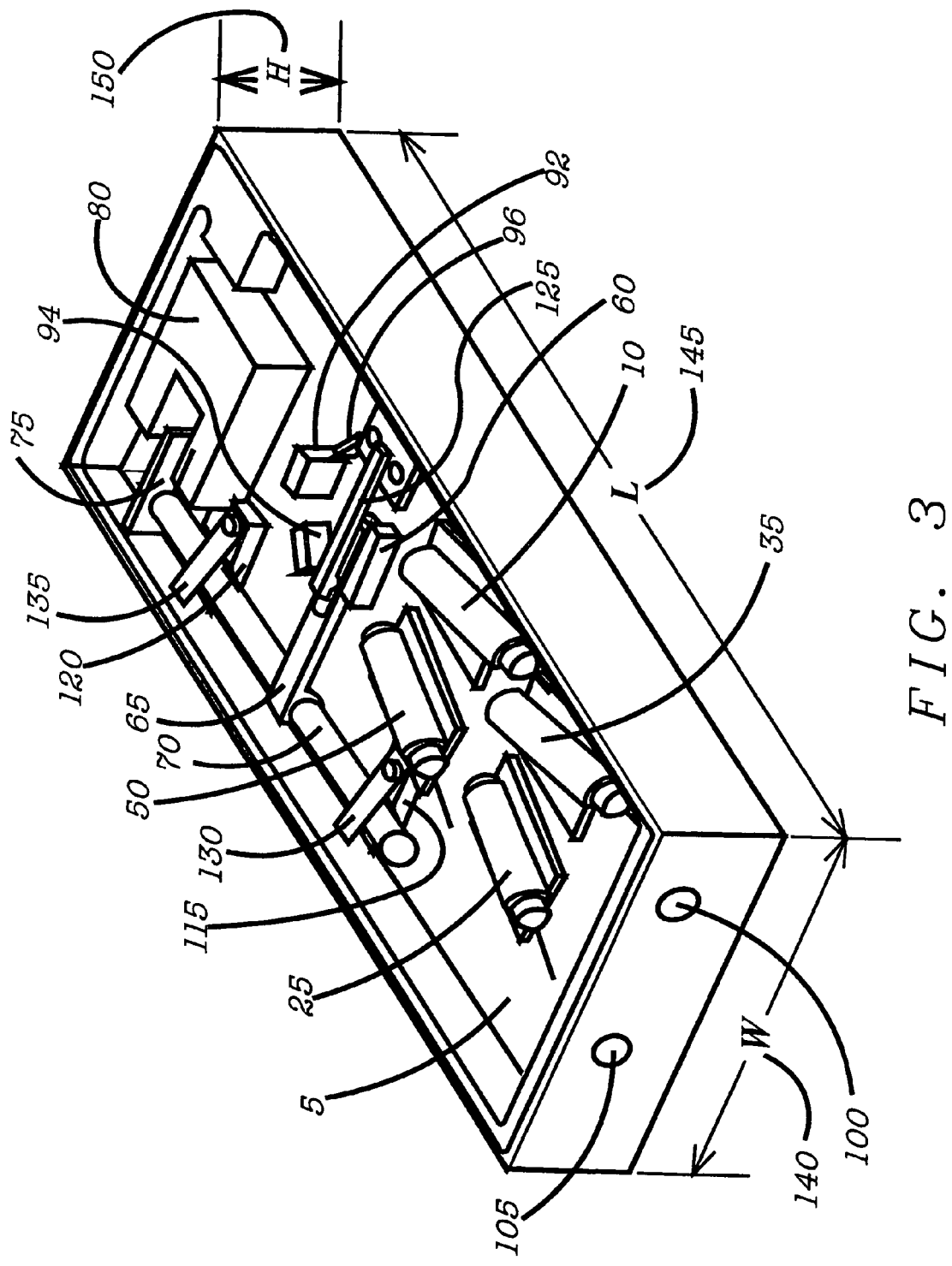
FIG. 3 is a perspective view of the optical switch of this invention

Refer now to FIG. 3 for a description of the preferred embodiment of the optical switch of this invention. The collimators of the first and second input ports 10 and 35 and the first and second output ports 50 and 25 are appropriately aligned and secured to the switch housing 5. Fiber optic cables are guided through the openings 100 and 105 of the switch housing 5 and connected to the collimators of the first and second input ports 10 and 35 and the first and second output ports 50 and 25.

The mirror 60 is attached on the moveable arm 65, which is connected to the relay 80 by the rod 70 and the connector 75. The rod 70 is inserted and soldered to the movable arm 65. The connector 75 is inserted and soldered to the rod 70. The mirror 60 is soldered or adhered by epoxy onto the movable arm 65. The rod 70 is then placed into the V-grooves of the supporting blocks 115 and 120. The V-grooves of the supporting blocks 115 and 120 have a nickel coating to provide a smooth contact surface for the rod 70. The v-groove springs 130 and 135 is placed on the rod 70 to apply pressure to control the friction between the rod and the v-groove. If the friction is either too large or too small, the rod 70 will not rotate properly. The arm spring 125 is placed upon the moveable arm 65 to limit the movement of the moveable arm 65 by applying a spring force from the top of the moveable arm 65. The arm spring 125 consists of a stainless steel ball, copper spring, and a spring holder. The stainless steel ball, copper spring, and a spring holder are soldered together for better durability.

The relay 80 is cut so that the moving plunger of the relay 80 is exposed and capable of contacting the connector 75. When the plunger of the relay 75 moves upward, the connector 75 moves upward and rotates the rod 70. The moveable arm 65 and mirror 60 then moves upward by the rotation of the rod 70. When the relay 80 moves downward, the connector 75 moves downward and rotates the rod 70. The moveable arm 65 and mirror 60 then moves downward.

The switch housing 5 in the preferred embodiment has a width 140 of approximately 24 mm. The length 145 of the switch housing 5 is approximately 60 mm and the height 150 of the switch housing 5 is approximately 7 mm.

Figure 4:
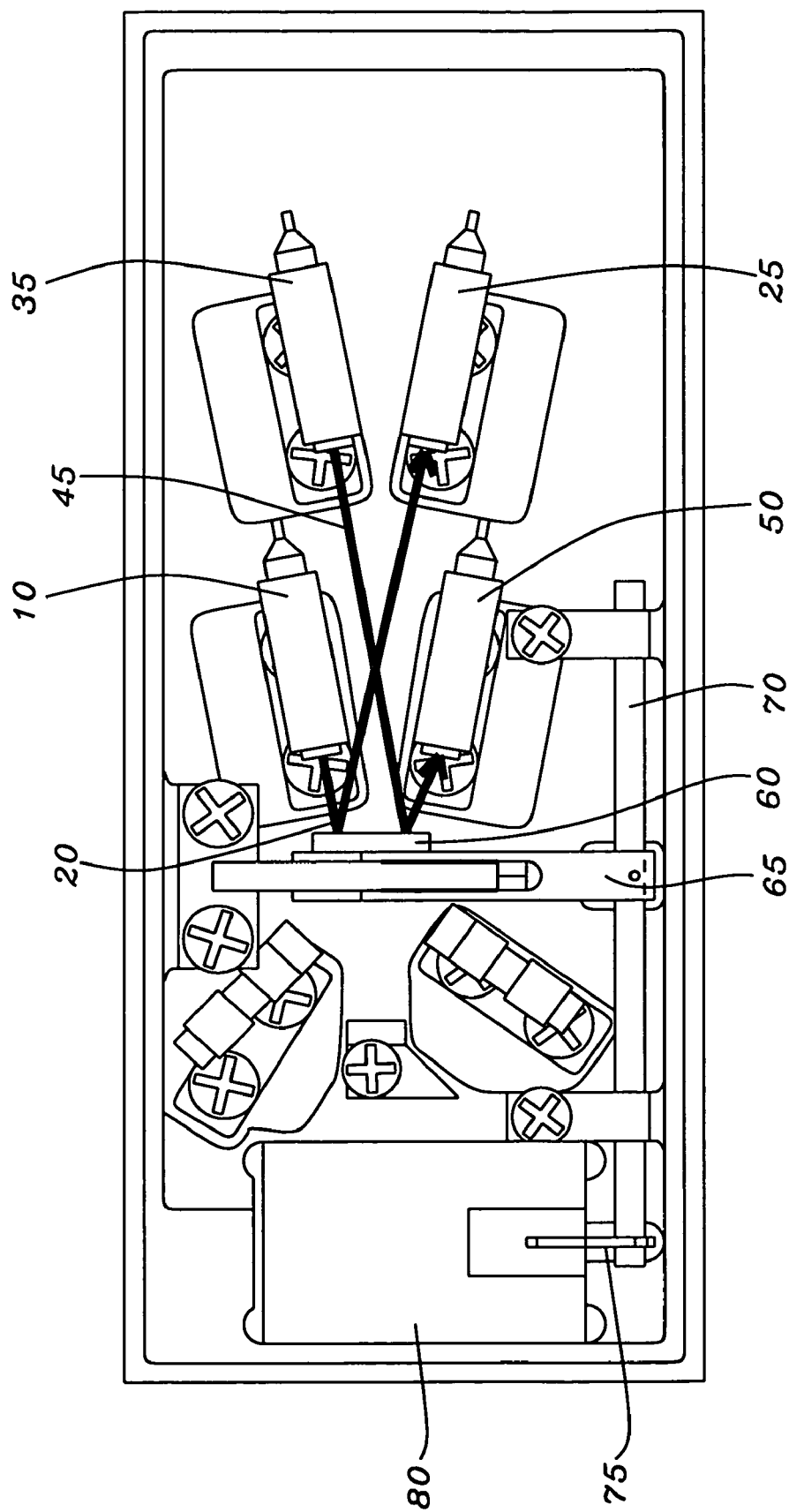
FIG. 4 is a top plan view of the optical switch of this invention illustrating the paths of the light signals in the normal mode of operation.
Figure 5:
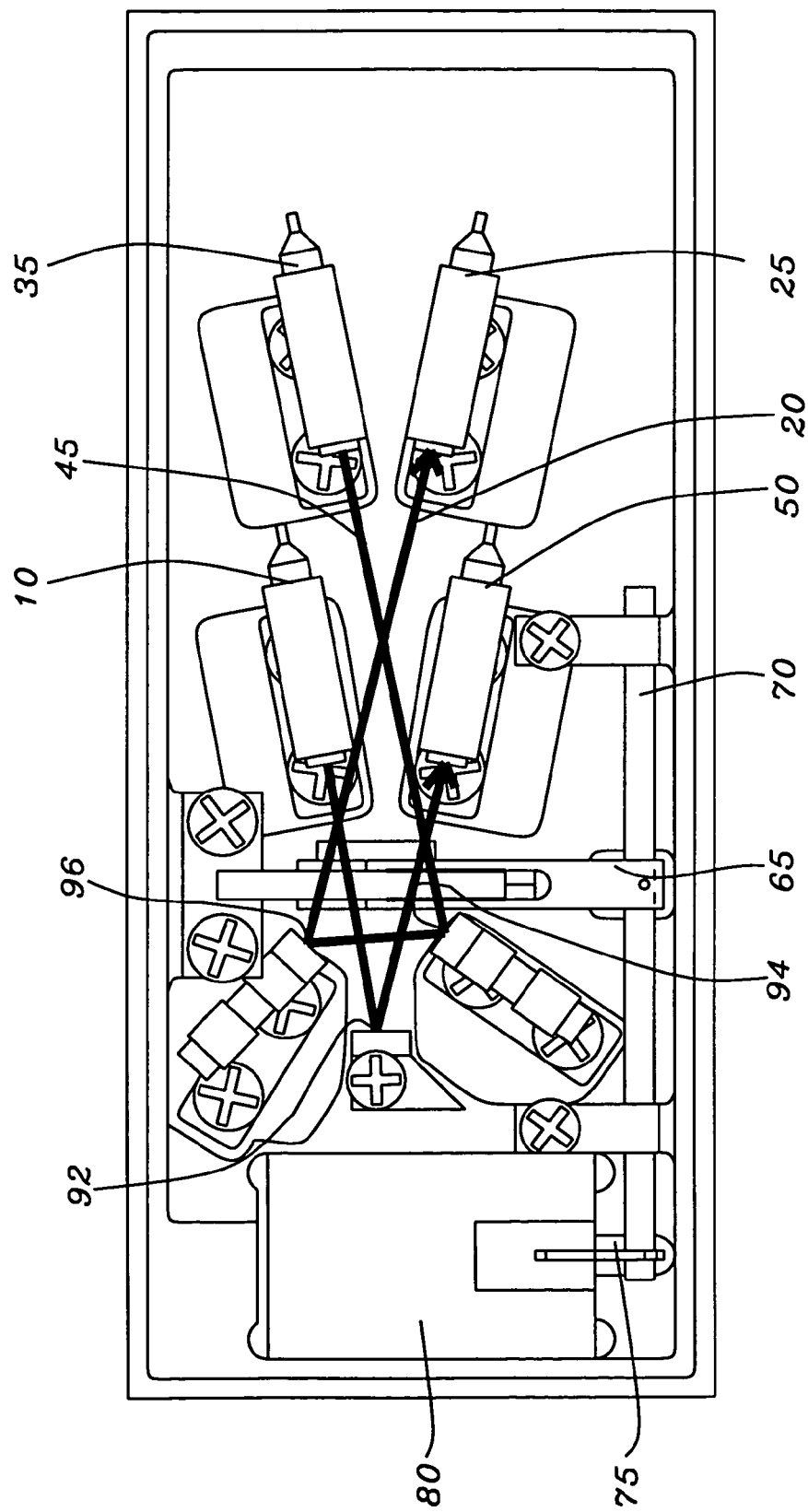
FIG. 5 is a top plan view of the optical switch of this invention illustrating the paths of the light signals in the loop back mode of operation.

Refer now to FIGS. 4 and 5 for a review of the paths of the light signals 20 and 45. When the moveable arm 65 and the mirror 60 are down as shown in FIG. 4, the light from input port 10 is transferred to output port 25, and the light from input port 35 is transferred to output port 50 by reflection from the mirror 60. This is the normal mode of operation. When the moveable arm 65 and mirror 60 are up as shown in FIG. 5, the light from input port 10 is reflected from the mirror 92 to output port 50, and the light from input port 35 is reflected from the mirrors 94 and 96 to output port 25. This is the loop back mode.

The mirrors 60, 92, 94, and 96 as employed in the present invention have certain losses. Typically these losses of each mirror is 0.05~0.1 dB. The alignment is accomplished during assembly and cannot be done during field service. Small grooves are machined in the housing of the mirrors 60, 92, 94, and 96 to guide the light signals 20 and 45 from first and second input ports 10 and 65 and to the first and second output ports 50 and 25. These grooves facilitate the alignment process and improve accuracy.

The assembly and alignment of the switch of this invention begins to by placing the collimator of the first input port 10 on the surface of the switch housing 5. The collimator of first input port 10 is attached to the switch housing 5. The mirror 60 is set such that the light signal 20 from first input port 10 is transferred to the collimator of the second output port 35 collimator of the second output port 25 is aligned and attached to the switch housing 5. The collimator of second input port 35 is then attached onto the switch housing 5. The mirror 60 is set such that the light signal 45 from second input port 35 is transferred to the collimator of the first output port 50. The collimator of the first output port 50 is aligned and attached to the switch housing 5. The relay 80 is activated forcing the mirror 60 to move upward. The mirror 92 is aligned and adjusted such that the light signal 20 from the collimator of first input port 10 is transferred to the collimator of the first output port 50. The mirror 92 is then soldered or adhered with epoxy to the switch housing 5. The mirrors 94 and 96 are aligned and adjusted such that the light signal 45 from the collimator of second input port 35 is transferred to the collimator of the second output port 25. The mirrors 94 and 96 are soldered to the switch housing 5.

In the preferred embodiment, two pieces of materials are between each of the collimators 10, 25, 35, and 50 and the switch housing 5. A piece of printed circuit board (PCB) (3.2×7.6×0.4 mm W×L×H) is bounded to the switch housing with epoxy 153ND or 353ND4. A collimator holder (3.2× 8.8×0.8 mm W×L×H) is bounded to the PCB with epoxy (type 353ND or 353ND4 epoxy) for each of the collimators 10, 25, 35, and 50. Each collimator holder is aluminum with a gold coating to enable soldering to each of the collimators. The PCB insulates the switch housing 5 from heat when soldering when each of the collimators 10, 25, 35, and 50 is soldered to the collimator holder. Finally, two screws secure both the PCB and collimator holder to the switch housing 5.

The mirrors 60, 92, 94, and 96 each have two coatings. One side of each of the mirrors 60, 92, 94, and 96 is coated with solderable gold and the coating on the opposing side of the mirrors 60, 92, 94, and 96 are reflective. The reflective coating consists of five layers as listed in table 1.

TABLE 1

| Layer | Material | Packing Density | Refractive Index | Extinction Coefficient | Thickness |
|---|---|---|---|---|---|
| Medium | Air | | 1.0000 | 0.0 | |
| 1 | Si (lossy) | 1.0 | 3.8000 | 0.001 | 0.25 μm |
| 2 | SiO2 | 1.0 | 1.14464 | 0.0 | 0.25 μm |
| 3 | Si (lossy) | 1.0 | 3.8000 | 0.001 | 0.25 μm |
| 4 | SiO2 | 1.0 | 1.4464 | 0.0 | 0.25 μm |
| 5 | Al | 1.0 | 2.0381 | 12.6904700 | 0.25 μm |
| Substrate | Glass | | | 1.5073 | |

Packing density is the fraction of a volume filled by a given collection of solids. Extinction coefficient is the fraction of light lost to scattering and absorption per unit distance in a participating medium and is normally given in standard units as a fraction per meter.

The 2×2 switch of this invention, as described, provides a packaging structure that allows the fiber optic cables to enter the switch housing on the same side. Further, the 2×2 switch of this invention implements the switch using four mirrors, as opposed to the six mirrors of the prior art. This allows the placement of the 2×2 switch in a rack and panel environment for each of construction of a communication network. Minimizing the number of mirrors reduces the losses and dispersion to the light signals.

While this invention has been particularly shown and described with reference to the preferred embodiments thereof, it will be understood by those skilled in the art that various changes in form and details may be made without departing from the spirit and scope of the invention.

The invention claimed is:

1. An apparatus for switching a first light signal that is normally transferred from a first input port to a second output port and a second light signal that is normally transferred from a second input port to a first output port such that the first light signal is transferred from the first input port to the first output port and the second light signal is transferred from the second input port to the second output port in a loop back mode, said apparatus comprising:

an adjustable light signal steering element comprising a single light bending element mounted onto a light bending element carrier attached to a bar such that the single light bending element is selectively placed in a path of said first and second light signals to transfer the first light signal from the first input port to the second output port and the second light signal from the second input port to the first output port;

a steering element actuator in communication with said light signal steering element to reposition said light signal steering element such that said light signal steering element is in the path of the first and second light signals to transfer said first and second light signals from said first and second input ports to the selected first and second output ports;

an arm connected to the bar onto which the light bending element is attached and connected such that the steering element actuator causes the arm to rotate the light bending element to selectively place the light bending element in the path of said first and second light signals; and an arm spring placed upon the arm to limit the movement of the moveable arm by applying a spring force from a top surface of the arm to hold the arm resistant to vibration or mechanical impact that will change a position of said adjustable light signal steering element to cause said first and second light signals to follow an undesired optical path.

2. The apparatus of claim 1 further comprising a fixed light signal steering element placed in the path of the first and second light signals such that the first light signal from the first input port is transferred normally by default to said first output port and the second light signal from the second input port is transferred normally by default to said second output port.

3. The apparatus of claim 2 wherein the fixed light steering element is selected from the group of light bending elements consisting of reflective elements, refractive elements, and diffractive elements.

4. The apparatus of claim 2 wherein the fixed light steering element is a plurality of mirrors placed to guide the first and second light signals from the first and second input ports to the default first and second output ports.

5. The apparatus of claim 1 wherein:

said single light bending element receives said first and second light signals from the first and second input ports and directs said light signals to the selected first and second output ports; and said light bending element carrier is connected to said steering element actuator to selectively place said light bending element in the path of said first and second light signals.

6. The apparatus of claim 5 wherein in the light bending element is selected from the group of light bending elements consisting of reflective elements, refractive elements, and diffractive elements.

7. The apparatus of claim 5 wherein the light bending element carrier causes the light bending element to move perpendicularly from an axis of the path of said first and second light signals to selectively place the light bending element in the path of the first and second light signals to steer said light signal to the selected first and second output port.

8. The apparatus of claim 5 wherein the light bending element is moved perpendicularly to the axis of the path of said first and second light signals when the arm is rotated.

9. The apparatus of claim 1 wherein the steering element actuator is a relay to cause the selective placement of said light steering element in the path of the first and second light signals.

10. The apparatus of claim 8 further comprising:

supporting blocks having v-grooves with a smooth contact surface into which said arm is placed; and v-groove springs placed on said arm to apply pressure to control the friction between the arm and the v-groove.

11. A two by two optical switch for routing each of two light signals received at two input ports selectively between two output ports, said two by two optical switch comprising:

an adjustable light signal steering element comprising a light bending element mounted onto a light bending element carrier attached to a bar such that the single light bending element is selectively placed in a path of each of said two light signals between said two input ports and said two output ports to exchange the routing of each of the two light signals from their normal routing between the two input ports and the two output ports to the routing of the two light signals from the two input ports to opposing output ports to which the respective of the two light signals are not normally routed;

a steering element actuator in communication with said adjustable light signal steering element to reposition said light signal steering element such that said light signal steering element is placed in the path of two light signals received from said two input ports is steered to the selected two output ports;

an arm connected to the bar onto which the light bending element is attached and connected such that the steering element actuator causes the arm to rotate the light bending element to selectively place the light bending element in the path of said two light signals; and an arm spring placed upon the arm to limit the movement of the moveable arm by applying a spring force from a top surface of the arm to hold the arm resistant to vibration or mechanical impact that will change a position of said adjustable light signal steering element to cause said two light signals to follow an undesired optical path.

12. The two by two optical switch of claim 11 further comprising at least one fixed light signal steering element placed in the path of said two light signals such that the light signals from each of the two input ports is transferred to a normally default output port of said two output ports.

13. The two by two optical switch of claim 12 wherein the fixed light steering elements are selected from the group of light bending elements consisting of reflective elements, refractive elements, and diffractive elements.

14. The two by two optical switch of claim 12 wherein the fixed light steering elements are a plurality of mirrors placed to guide the light signal from the two input ports to the two default output ports.

15. The two by two optical switch of claim 11 wherein:
said single light bending element receives said two light signals from said two input ports and directs said light signals to one selected output port; and
said light bending element carrier is connected to said steering element actuator to selectively place said light bending element in the path of said two light signals.

16. The two by two optical switch of claim 15 wherein in the light bending element is selected from the group of light bending elements consisting of reflective elements, refractive elements, and diffractive elements.

17. The two by two optical switch of claim 15 wherein the light bending element carrier causes the light bending element to move perpendicularly from an axis of the path of said two light signals to selectively place the light bending element in the path of the two light signals to steer said two light signals to the selected output ports.

18. The two by two optical switch of claim 15 wherein the light bending element is moved perpendicularly to the axis of the two light paths when the arm is rotated.

19. The two by two optical switch of claim 11 wherein the steering element actuator is a relay to cause the selective placement of said light steering element in the path of said two light signals.

20. The two by two optical switch of claim 18 wherein further comprising:
supporting blocks having v-grooves with a smooth contact surface into which said arm is placed; and
v-groove springs placed on said arm to apply pressure to control the friction between the rod and the v-groove.

21. An optical switch comprising
a first input port to transmit a first light signal;
a second input port to transmit a second light signal;
a first output port for receiving the second light signal in a normal mode and the first light signal in a loop back mode;
a second output port for receiving the first light signal in the normal mode and the second light signal in the loop back mode;
a fixed light signal steering element placed in a path of the first and second light signals such the first and second light signals is transferred respectively to first and second output ports in the loop back mode;

an adjustable light signal steering element comprising a single light bending element mounted onto a light bending element carrier attached to a bar such that the single light bending element is selectively placed in the path of the first and second light signals to transfer the first and second light signals respectively to the second and first output ports in the normal mode;

a steering element actuator in communication with adjustable light signal steering element to reposition the adjustable light signal steering element into the paths of the first and second light signal during the normal mode and out of the paths of the first and second light signals in the loop back mode;

a rod connected to the bar onto which the light bending element attached and connected such that the steering element actuator causes the rod to rotate the light bending element to selectively place the light bending element in the path of said two light signals; and a rod spring placed upon the rod to limit the movement of the moveable rod by applying a spring force from a top surface of the rod to hold the rod resistant to vibration or mechanical impact that will change a position of said adjustable light signal steering element to cause said two light signals to follow an undesired optical path.

22. The optical switch of claim 21 wherein the fixed light steering elements are selected from the group of light bending elements consisting of reflective elements, refractive elements, and diffractive elements.

23. The optical switch of claim 21 wherein the fixed light steering elements are a plurality of mirrors placed to guide the first and second light signal from the first and second input ports respectively to the first and second output port in the loop back mode.

24. The optical switch of claim 21 wherein:
said single light bending element receives said first and light signals from the first and second input ports and directs said first and second light signals respectively to the second and first output ports in the normal mode; and
said light bending element carrier connected to said steering element actuator to selectively place said light bending element in the path of said first and second light signals.

25. The optical switch of claim 24 wherein in the light bending element is selected from the group of light bending elements consisting of reflective elements, refractive elements, and diffractive elements.

26. The optical switch of claim 24 wherein the light bending element carrier causes the light bending element to move perpendicularly from an axis of the path of said first and second light signals to selectively place the light bending element in the paths of the first and second light signals to steer said first and second light signals to the second and first output ports in the normal mode.

27. The optical switch of claim 24 wherein the light bending element is moved perpendicularly to the axis of the paths of the first and second light signals when the rod is rotated.

28. The optical switch of claim 21 wherein the steering element actuator is a relay to cause the selective placement the light steering element in the paths of the first and second light signals.

29. The optical switch of claim 27 wherein further comprising:
supporting blocks having v-grooves with a smooth contact surface into which said rod is placed; and v-groove springs placed on said rod to apply pressure to control the friction between the rod and the v-groove.

30. A method for switching two light signals selectively between two output ports, comprising the steps of:
receiving said two light signals at two input ports;
providing a fixed light signal steering element placed in a path of the two light signals such that each of the two light signals from the two input ports is transferred to a normally default output port of the two output ports;
providing an adjustable light steering element comprising a light bending element mounted onto a light bending element carrier attached to a bar such that the single light bending element to convey each of said two light signals as received from said two input port to one of two output ports;
rotating a rod connected to the light bending element carrier to position said adjustable light signal steering element in a path of said two light signals as received from said two input ports such that each of said two light signals are transferred from the two input ports to one of two selected output ports; and
placing a rod spring upon said arm to limit the movement of the moveable arm by applying a spring force from a top surface of said arm to hold said adjustable light signal steering element position to be resistant to vibration, mechanical impact that will change a position of said adjustable light signal steering element to cause said two light signals to follow an undesired optical path.

31. The method of claim 30
wherein positioning said adjustable light signal steering element in a path of said two light signals comprises the step of placing said adjustable light signal steering element between said fixed light signal steering element and said two input ports.

32. The method of claim 31 wherein the fixed light steering element is selected from the group of light bending elements consisting of reflective elements, refractive elements, and diffractive elements.

33. The method of claim 31 wherein the fixed light steering element is a plurality of mirrors placed to guide the light signal from the input port to the default output port.

34. The method of claim 30 further comprising the steps of:
receiving by said light bending element said two light signals from the two input ports;
directing said two light signals to the selected two output ports; and
connecting said light bending element carrier to said steering element actuator to selectively place said light bending element in the path of said light signal.

35. The method of claim 34 wherein in the light bending element is selected from the group of light bending elements consisting of reflective elements, refractive elements, and diffractive elements.

36. The method of claim 34 wherein the light bending element carrier causes the light bending element to move perpendicularly from an axis of the path of said two light signals to selectively place the light bending element in the path of the two light signals to steer said two light signals to the selected two output ports.

37. The method of claim 34 further comprising the step of moving the light bending element perpendicularly to the axis of the light path when the rod is rotated.

38. The method of claim 30 wherein positioning said adjustable light signal steering element in a path of said two light signals is performed by a relay to cause the selective placement of said adjustable light steering element in the path of the two light signals.

39. The method of claim 37 wherein further comprises the steps of:
providing supporting blocks having v-grooves with a smooth contact surface;
placing the rod into the v-grooves of the supporting blocks; and
placing v-groove springs on said rod to apply pressure to control the friction between the rod and the v-groove.

* * * * *